(12) United States Patent
Bartkowska et al.

(10) Patent No.: US 8,021,706 B2
(45) Date of Patent: Sep. 20, 2011

(54) FROZEN AERATED PRODUCTS

(75) Inventors: Beata Bartkowska, Bedford (GB); Timothy John Foster, Vlaardingen (NL); Sarah Jane Gray, Bedford (GB); Sudarshi Tanuja Regismond, Vlaardingen (NL); Jeffrey Underdown, Bedford (GB)

(73) Assignee: Good Humor-Breyers Ice Cream, division of Conopco, Inc., Green Bay, WI (US)

( * ) Notice: Subject to any disclaimer, the term of this patent is extended or adjusted under 35 U.S.C. 154(b) by 1401 days.

(21) Appl. No.: 10/664,101

(22) Filed: Sep. 17, 2003

(65) Prior Publication Data

US 2004/0071835 A1    Apr. 15, 2004

(30) Foreign Application Priority Data

Sep. 17, 2002    (GB) .................................. 0221565.5

(51) Int. Cl.
*A23G 9/00*    (2006.01)
(52) U.S. Cl. ........................ 426/565; 426/615; 426/660
(58) Field of Classification Search .................. 426/564, 426/565, 103
See application file for complete search history.

(56) References Cited

U.S. PATENT DOCUMENTS

| | | |
|---|---|---|
| 3,914,441 A | 10/1975 | Finney et al. |
| 4,021,583 A | 5/1977 | Arden |
| 4,143,172 A | 3/1979 | Mitchell et al. |
| 4,244,981 A * | 1/1981 | Blake .............. 426/567 |
| 4,334,155 A | 6/1982 | Gieschen et al. |
| 4,368,211 A | 1/1983 | Blake et al. |
| 4,400,406 A | 8/1983 | Morley et al. |
| 4,410,555 A | 10/1983 | Richardson |
| 4,435,439 A | 3/1984 | Morris |
| 4,500,553 A | 2/1985 | Liggett et al. |
| 4,609,561 A | 9/1986 | Wade et al. |
| 4,816,283 A | 3/1989 | Wade et al. |
| 4,830,868 A | 5/1989 | Wade et al. |
| 4,948,614 A | 8/1990 | Feldpausch |
| 4,954,360 A | 9/1990 | Barnett |
| 4,971,824 A | 11/1990 | Jonas |
| 5,633,029 A | 5/1997 | Cox et al. |
| 5,645,881 A | 7/1997 | Tancibok et al. |
| 5,665,413 A | 9/1997 | Rossiter |
| 6,423,359 B1 | 7/2002 | Braverman |
| 6,432,466 B2 * | 8/2002 | Brake et al. .............. 426/565 |
| 6,511,694 B2 * | 1/2003 | Huang et al. .............. 426/565 |
| 2003/0147995 A1 | 8/2003 | Koss et al. |

FOREIGN PATENT DOCUMENTS

| | | |
|---|---|---|
| AU | 2002253285 | 11/2002 |
| EP | 0 220 836 | 5/1987 |
| EP | 0 480 665 B1 | 10/1991 |
| EP | 0 710 074 | 5/1996 |
| EP | 0 883 350 | 12/1998 |
| EP | 1 072 196 | 1/2001 |
| EP | 1 110 460 | 6/2001 |
| EP | 1180329 | 2/2002 |
| FR | 2 369 801 | 7/1978 |
| GB | 2 094 128 | 9/1982 |
| WO | 89/00817 | 2/1989 |
| WO | 94/04043 | 3/1994 |
| WO | 94/10854 | 5/1994 |
| WO | 97/26799 | 7/1997 |
| WO | 98/09534 | 3/1998 |
| WO | 98/09536 | 3/1998 |
| WO | 98/18350 | 5/1998 |
| WO | 01/47369 | 7/2001 |
| WO | 01/50879 | 7/2001 |

OTHER PUBLICATIONS

Arbuckle, W.S. Ice Cream, 2nd Edition AVI Publishing 1972. p. 96.*
GB Search Report No. GB 0221565.5 dated Feb. 14, 2003.
European Search Report No. EP 03 25 5095 dated Jan. 21, 2004.
Koxholt, M.; McIntosh, T.; Eisenmann, B. (1999): Enhanced stability of ice cream by suing particulated whey proteins. European Dairy Magazine 10(1): 14-15).
United States Department of Agriculture (USDA) authorized Commercial Item Description AQ-A-20252A dated Jun. 5, 2000.
Revised Proposal Draft Codex General Standard for Fruit Juices and Nectars dated Aug. 9, 2001 issued by the National Juice Products Association.
AOAC International. 1995. "Total, soluble and insoluble dietary fiber in foods". AOAC official method 991.43. Official Methods of Analysis, $16^{th}$ ed.
Souci, Fachmann and Kraut Food Composition and Nutrition Tables 1986/7 $3^{rd}$ revised and completed edition. The data for strawberry appears on p. 793, the data for apple on p. 764 and the data for mango on p. 868.
Institute of Food Science and Technology—"Dietary Fibre"—2001—pp. 1-7.
Jensen, R.G. et al., "Estimation of the Monoglyceride Content of Milk"—1958, pp. 232-239.
Italian cookbook "La Cucina Italiana—Ricette D'Oro", dated 2002—pp. 1233 discloses manufacture of produced called "Semifreddo a la pera"—English Translation enclosed.

(Continued)

*Primary Examiner* — Kelly Bekker
(74) *Attorney, Agent, or Firm* — Michael P. Aronson

(57) ABSTRACT

A frozen aerated product having an overrun of between about 10% and about 250% and a pH, when melted, in the range about 3.5 to about 5.2, comprises water, 0 to about 20 w/w % fat, about 0.25 to about 20 w/w % milk solids not fat, about 0.05 to about 1.5 w/w % soluble dietary fibre and about 0.1 to about 5 w/w % of insoluble dietary fibre, about 0.1 to about 35 w/w % sweetener but no additional stabilisers or emulsifiers as herein defined. The soluble and insoluble dietary fibre may be derived from fruits or vegetables for example from one or more fruit purees, one or more vegetable purees or mixtures thereof.

8 Claims, No Drawings

OTHER PUBLICATIONS

Italian cookbook "Il Cucciaio Verde" dated 1997, p. 538 gives recipe for "Gelato di Ribes"—English translation enclosed.
"Ice Cream" book compilation by Marshall and Arbuckle, 5$^{th}$ Edition, 2000.
"Food Composition and Nutrition Tables" by Souci, Fachmann & Kraut, 7$^{th}$ revised & completed edition, 2008.
General disclosure on Pectin.
"Fiber Contents of Selected Raw and Processed Vegetables, Fruits and Fruit Juices as Served" by J. Zyren et al., Journal of Food Science, vol. 48, 1983, pp. 600-603.
Abstract—Manabe et al. article, published 1999 on Pectin Content of Mango.

* cited by examiner

FROZEN AERATED PRODUCTS

TECHNICAL FIELD OF THE INVENTION

The invention relates to a frozen aerated product such as ice cream, wherein the frozen aerated product is stabilised by plant derived ingredients in their unrefined state and has no additional refined emulsifiers or stabilisers. This invention also relates to methods of preparation of a frozen aerated product.

BACKGROUND OF THE INVENTION

The majority of industrially manufactured frozen aerated products utilise added emulsifiers and stabilisers for their structuring and stabilising ability. These ingredients are used to provide viscosity enhancement, gel formation and water-binding ability and are thought to help prevent ice recrystallisation, to provide the mouthfeel expected by the consumer and to enhance the shelf life and thermal stability of the product. The presence of these emulsifiers and stabilisers in such products are however perceived by many consumers as artificial or unnatural and therefore undesirable. Previous attempts have been made to produce so-called all-natural ice creams, which do not contain any emulsifiers and/or stabilisers but these have not been totally satisfactory. Some suffer from the disadvantage that they have a thin and icy mouthfeel together with a fast melting behaviour and the overall quality tends to deteriorate rapidly during storage. Other attempts such as those involving ultra-high pressure treatment (WO98/18350), low temperature extrusion (WO98/09534, WO98/09536), milk fermentation (EP1180329), casein modification (WO94/10854), whey protein aggregation (Koxholt, M.; McIntosh, T.; Eisenmann, B. [1999]: Enhanced stability of ice cream by using particulated whey proteins. European Dairy Magazine 10(1): 14-15) All the above require additional process steps together with investment in extra and often specialised equipment. These factors lead to higher processing costs and an increase in the manufacturing complexity associated with the product. The use of high fat (typically 20% or higher) levels has also been proposed but as well as substantially increasing the raw material costs, also has a negative impact on dietary health and nutrition.

DEFINITIONS

Emulsifiers

Emulsifiers are defined as in Arbuckle, W. S., Ice Cream, 5$^{th}$ Edition, AVI Publishing, 1996, ch 6, p75-79.

Stabilisers

Stabilisers are defined as in Arbuckle, W. S., Ice Cream, 5$^{th}$ Edition, AVI Publishing, 1996, ch 6, p71-75.

Frozen Aerated Product

The term "frozen aerated product" as used in this specification means a frozen product made by freezing a pasteurised mix of ingredients with agitation to incorporate air into the product.

Overrun

Overrun is defined as in Ice Cream—W. S. Arbuckle—AVI Publishing, 1972, page 194. Several ways of calculating the overrun are given in this book. In this specification overrun is measured according to the formula $$\% \text{ Overrun} = 100 \times [Wt_{mix} - Wt_{product}]/Wt_{product}$$

in which $Wt_{mix}$ is the weight of a certain volume of the mix from which the frozen product is to be prepared and $Wt_{product}$ is the weight of the same volume of the product after it has been frozen and aerated.

Fruit Puree

The term "fruit puree" as used in this specification means a homogeneous product which has been prepared from whole or peeled fruit of good maturity, which has been pulped by a suitable physical process. {See United States Department of Agriculture (USDA) authorised Commercial Item Description A-A-20252A dated Jun. 5, 2000 and the Revised Proposal Draft Codex General Standard For Fruit Juices and Nectars dated Aug. 9, 2001 issued by the National Juice Products Association}. The puree may or may not have had a portion of the water physically removed. The latter of the two references identified above defines Fruit Nectar as a fruit puree to which water and optionally sugars have been added. The expression "fruit puree" as used herein is intended to embrace such Fruit Nectars.

pH

In this specification pH is determined by using a Jenway 3020 pH meter equipped with a BDH Gelpas epoxy body sealed reference combination pH electrode and a temperature electrode. The pH meter was calibrated using two buffers at pH 7 and 4 at 10° C. The pH of the premixes and the melted products of the present invention was determined at 8-12° C. To measure the pH of melted product frozen ice cream blocks were removed from their packaging and placed in covered tubs and allowed to melt for 48 hours at 5° C. in a constant temperature room. Melted ice creams were gently stirred to incorporate any serum which may have separated, before the pH was determined.

BRIEF DESCRIPTION OF THE INVENTION

In accordance with a first object of the invention there is provided a frozen aerated product having an overrun of between 10% and 250% and a pH, when melted, in the range about 3.5 to about 5.2, said frozen aerated product comprising water, 0 to about 20 w/w % fat, about 0.25 to about 20 w/w % milk solids not fat, about 0.05 to about 1.5 w/w % soluble dietary fibre and about 0.1 to about5 w/w % of insoluble dietary fibre, about0.1 to about 35 w/w % sweetener but no additional stabilisers or emulsifiers as herein defined.

Preferably, the frozen aerated product according to this invention is an ice cream.

The fat used may be a dairy fat, a non-dairy fat or a mixture of both. When the fat is a dairy fat, it may be for example, any milk fat source such as butter oil, butter, cream, or a mixture thereof. Where an effective amount of non-dairy fat is to be included in the product, this non-dairy fat may, for example, be an edible oil or fat, preferably a vegetable oil such as peanut oil, palm kernel oil, coconut oil, soy bean oil, olive oil or mixtures thereof or a hydrogenated fat. More preferably the non-dairy fat comprises coconut oil.

The milk solids not fat (MSNF) contains milk proteins and lactose. MSNF may be provided by using dried milk products, liquid milk products or concentrated milk products which may also be used as the source of the dairy fats above.

Suitable products include dried whole milk, dried skimmed milk, dried whey, liquid milk, concentrated milk products and mixtures thereof.

Preferred frozen aerated products according to the invention may contain (a) at least about 0.1 w/w % preferably at least about 0.2 w/w % but no more than about 1.2 w/w % preferably no more than about 1 w/w % soluble dietary fibre and (b) at least about 0.2 w/w % preferably at least about 0.3 w/w % and no more than about 2 w/w % preferably no more than about 1 w/w % insoluble dietary fibre. An Information Statement issued by the Institute of Food Science and Technology dated 19 Jun. 2001 entitled Dietary Fibre states that "Dietary fibre is now defined as food material, particularly plant material that is not hydrolysed by enzymes secreted by the human digestive tract but that may be digested by microflora in the gut". The same publication states that dietary fibre may be divided into two forms based on their water solubility. Insoluble dietary fibre is said to include celluloses, some hemicelluloses and lignin and soluble dietary fibre is said to include B glucans, pectins, gums, mucilages and some hemicelluloses. The amount of dietary fibre is determined as set out in AOAC International. 1995. "Total, soluble and insoluble dietary fiber in foods". AOAC official method 991.43. Official Methods of Analysis, 16th ed.

The soluble dietary fibre and the insoluble dietary fibre may be derived from fruits or vegetables for example from one or more fruit purees, one or more vegetable purees or mixtures thereof.

The requisite amounts of soluble dietary fibre and of insoluble dietary fibre may be provided by incorporating into the mix from which the frozen aerated product is prepared the appropriate amount of a fruit puree. The fruit puree may be obtained from any fruit or mixture of fruits which is capable of providing the requisite amounts of soluble dietary fibre and of insoluble dietary fibre. Suitable fruits include apple, banana, blackberry, blackcurrant, blueberry, cherry, cranberry, gooseberry, grapes, guava, kiwi fruit, mango, orange, papaya, passion fruit, peach, pear, pineapple, plums, pomegranate, pumpkin, raspberry, redcurrant, strawberry and tomato. In a preferred embodiment of the invention, the puree has been prepared from heat treated fruits of good maturity. The physical process used to pulp the fruit in the production of the puree may include chopping, sieving, grinding and milling. Preferably the puree will have been sieved, for example through a 0.5 mm mesh screen to remove seeds etc. The amount of fruit puree to be incorporated into the frozen aerated products of the present invention may be in the range about 5 to about 80% w/w.

The requisite amounts of soluble dietary fibre and of insoluble dietary fibre may be provided by incorporating into the mix from which the frozen aerated product is prepared the appropriate amount of a vegetable puree. A "vegetable puree" as used herein is a puree made from a plant source other than a fruit but which has the same characteristics as the fruit purees defined hereinbefore. Suitable non-fruit plant sources include beans (green, string), brussel sprouts, carrot, cauliflower, celeriac, kale, onions, sugar beet, sweet potato and white cabbage.

Mixtures of fruit purees and/or mixtures of vegetable purees may be used to provide the requisite amounts of soluble dietary fibre and of insoluble dietary fibre.

In the frozen aerated products of the present invention, no additional stabilisers which are typically present in aerated frozen products are used. Examples of known stabilisers include alginates, gum arabic, gum ghatti, gum karaya, gum tragacanth, locust bean gum, carrageenan, xanthan gum, guar gum, gelatine, agar, sodium carboxymethylcellulose, microcrystalline cellulose, methyl and methylethyl celluloses, hydroxypropyl and hydroxypropylmethyl celluloses, low and high methoxyl pectins and mixtures thereof. Additionally in the frozen aerated products of the present invention no additional emulsifiers are used. Examples of known emulsifiers include mono- and di-glycerides of fatty acids, and polyoxyethylene derivatives of hexahydric alcohols (usually sorbitol), glycol and glycol esters. The present applicants have surprisingly found that the functions of these conventionally added components of ice cream are performed by the plant derived ingredients used in the products of the present invention.

Sweeteners such as sucrose, fructose, glucose, lactose, dextrose and invert sugar can be included in the pre-mix in either crystalline or liquid syrup form. Alternatively, or additionally, the sweetener may be a corn sweetener in either a crystalline form of refined corn sugar (dextrose and fructose), a dried corn syrup (corn syrup solids), a liquid corn syrup or a mixture thereof.

The frozen aerated products of the present invention show resistance to meltdown and to serum leakage for extended periods of time on exposure to a temperature above the melting point of the product. Resistance to meltdown and to serum leakage is determined by measuring the meltdown initiation time as described hereinafter. The frozen aerated product of the present invention satisfy the condition that meltdown initiation time is greater than about 60 minutes, preferably greater than about 120, more preferably greater than about 180 minutes, most preferably greater then about 240 minutes, when measured at 200° C. in the test described below.

The meltdown initiation times were determined in the following way. Tests were performed on a stainless steel wire mesh grid having a size of 25×25 cm, with 2.5 mm holes, 1 mm thick wire. The grids are placed on a 60° funnel with a bore size of 2 cm suspended over a collecting vessel (of large enough volume to collect the entire sample tested) placed on balances for weighing the material collected in the vessel. The balances are connected to a data logging system to record the mass collected. The grids were placed in a meltdown cabinet set at a constant temperature environment of 20° C., which was capable of holding up to 12 of these grids simultaneously.

For each formulation listed hereinafter in the examples, melting tests were performed on three samples of each product at 20° C. Each sample was in the form of a rectangular block measuring 14.5×9×3.8 cm and was placed on the grid with one of its larger flat faces in contact with the grid. Before placement in the cabinet the ice cream samples were equilibrated in a freezer at −25° C., and then weighed on a zeroed balance containing the mesh grid. They were then arranged randomly over the available positions in the meltdown cabinet. Once all samples were in place, the data logging system measured the amount of collected material every minute.

From the mass of the sample collected over this period, the percentage mass loss of the samples is calculated using the following formula.

$$\% \ MassLoss = \frac{M_t - M_0}{F} \times 100$$

wherein:
$M_t$=mass recorded (gram) at time t minute
$M_0$=mass recorded (gram) at start of analysis, t=0 minute
F=Initial mass of product (gram)

The meltdown initiation time for each sample of each formulation as observed. This is defined by the time that elapses before 4% of the initial weight of the sample has dropped into the collecting vessel.

The above meltdown experiments were repeated at 37° C. in the presence of dishes of water in the meltdown cabinet to prevent dehydration of the samples.

The frozen aerated products of the present invention may be prepared in several ways.

In accordance with a second aspect of the present invention there is provided a process for manufacturing a frozen aerated product having an overrun of between about 10% and about 250% and a pH, when melted, in the range about 3.5 to about 5.2, said frozen aerated product comprising water, 0 to about 20 w/w % fat, about 0.25 to about 20 w/w % milk solids not fat, about 0.1 to about 35 w/w % sweetener, about 0.05 to about 1.5 w/w % soluble dietary fibre, about 0.1 to about 5 w/w % of insoluble dietary fibre, but no additional stabilisers or emulsifiers, the process comprising the steps of:
- a) adjusting the pH of a fruit and/or vegetable puree to a value above the isoelectric point of any protein to be incorporated into the frozen aerated product
- b) producing a premix comprising fat, milk solids not fat, sweetener and about 5 to about 80 w/w % of the pH adjusted fruit puree
- c) homogenising and pasteurising the premix
- d) cooling the pasteurised premix
- e) adjusting the pH of the cooled pasteurised premix to about 3.5 to about 5.2, and
- f) freezing and aerating the homogenised premix to form the frozen aerated product.

The pH of the fruit and/or vegetable puree may be adjusted by the addition of base for example sodium hydroxide. The adjusted pH may be in the range about 4.9 to about 5.3.

Conveniently the premix may be produced by adding the MSNF and the sweetener followed by the fat (if used) to the fruit and/or vegetable puree.

The pH of the cooled premix is adjusted to a value in the range about 3.5 to about 5.2 by the addition of an edible acid. The edible acid may be citric acid. Fruit juice or concentrate may be used as the source of the edible acid.

In accordance with a third aspect of the present invention there is provided a process for manufacturing a frozen aerated product having an overrun of between about 10% and about 250% and a pH, when melted, in the range about 3.5 to about 5.2, said frozen aerated product comprising water, 0 to about 20 w/w % fat, about 0.25 to about 20 w/w % milk solids non fat, about 0.1 to about 35 w/w % sweetener, about 0.05 to about 1.5 w/w % soluble dietary fibre and about 0.1 to about 5 w/w % insoluble dietary fibre but no additional stabilisers or emulsifiers, the process comprising the steps of:
- a) producing a premix comprising water, fat, milk solids not fat, sweetener
- b) homogenising and pasteurising the premix
- c) cooling the pasteurised premix
- d) adding a fruit and/or vegetable puree containing sufficient soluble and insoluble fibre to provide the necessary soluble and insoluble fibre in the frozen aerated product
- e) freezing and aerating the mixture to form the frozen aerated product.

In a preferred embodiment of the process described in the previous paragraph, the fruit and/or vegetable puree is homogenised before it is added to the pasteurised premix.

Conveniently the premix may be produced by mixing the MSNF and the sweetener and then adding the fat (if used).

The processes of this invention includes the step of homogenising and pasteurising the mix. The mix may be homogenised using equipment and conditions commonly known in the industry for example a single stage valve homogeniser or an ultra high pressure (UHP) homogeniser. Pasteurisation of the homogenised mix can be conducted using any method and condition that is well known to a person skilled in this field for example high temperature short time (HTST) or low temperature long time (LTLT) pasteurisation. In a preferred homogenising and pasteurising step according to the processes of the present invention the temperature of the premix is raised to the pasteurisation temperature, the premix is homogenised and then held at the pasteurisation temperature for sufficient time to complete the pasteurisation.

After homogenisation and pasteurisation the mix is preferably held at a temperature between about 0° and about 6° C. for a period between about 1 and about 24 hours preferably with agitation. Preferably the product is held at a temperature between about 1° and about 5° C. with agitation for about 2 to about 18 hours, or more preferably for about 4 to about 12 hours.

The mix is then frozen and aerated. This may be achieved in any equipment suitable for this purpose and commonly known in the industry. One of ordinary skill in the art will readily be able to determine the required aeration pressure and throughput rate of the mix to obtain the desired aerated product.

The conditions of aeration are chosen to achieve an overrun of about 10% to about 250%. Preferably the overrun for the preferred ice cream products is between about 50% and about 150%, more preferably about 60% and about 120% and most preferably between about 0% and about 110%.

The aerated mix is then extruded, preferably directly, into containers.

DETAILED DESCRIPTION OF THE INVENTION

Examples of the products of the invention and comparative examples will now be described by way of illustration only, and not to limit the invention.

In the Table in the following Examples, the weights of the ingredients are given as w/w percentages of the finished ice cream. The percentages of soluble and insoluble dietary fibre given are calculated from data give in Souci, Fachmann and Kraut Food Composition and Nutrition Tables 1986/7 $3^{rd}$ revised and completed edition. The data for strawberry appears on page 793, the data for apple on page 764 and the data for mango on page 868. Meltdown initiation times and pH were determined by the methods described hereinbefore and the values obtained are given in Tables 1 and 2.

EXAMPLES 1 TO 10

Formulations containing the components listed in Table 1 were prepared by the method described below.

The pH of the fruit purees was measured and adjusted to a value above the isoelectric point of the proteins to be incorporated into the product by the addition of sodium hydoxide. The fruit puree was heated to 20° C. placed in a jacketed mix tank at 85° C., then water (if shown in Table 1), skimmed milk powder, whey, sucrose/dextrose/corn syrup and coconut oil were dissolved by mixing with a high shear mixer. Hot water was circulated in the jacket of the tank to maintain a premix temperature of 65° C.

The premix was heated using a plate heat exchanger to a temperature of 83° C., homogenised using a Crepaco single stage valve homogeniser at a pressure of 140 bar or in a Crepaco single stage valve homogeniser operating at a pressure of 300 bar with a 30 bar back-pressure. After holding the mix at 83° C. for 15 seconds, the mix was cooled using a plate heat exchanger to 5° C. and held at this temperature for at least 2 hours before freezing. The mix was acidified with citric acid to give the pH values listed in Table 1.

The mix containing the fruit puree was processed through a continuous ice cream freezer (type APV Technohoy MF75) fitted with a closed dasher rotating at a speed of 300-500 rpm and operating with a barrel pressure in the range 1-4 bar. All frozen aerated products were produced with a mix flow rate of 0.4 l/min, with an overrun in the range 100-250% and an extrusion temperature in the range −5° C. to −9° C. The frozen aerated products were collected in 500 ml waxed paper cartons and then hardened in a blast freezer at −35° C. for a period of 2 hours. The hardened products were then stored at −25° C.

TABLE 1

|  | Example 1 | Example 2 | Example 3 | Example 4 | Example 5 |
|---|---|---|---|---|---|
| Skimmed Milk Powder | 4.12 | 4.12 | 4.12 | 4.12 | 4.12 |
| Whey | 4 | 4 | 4 | 4 | 4 |
| Coconut Oil | 9 | 9 | 9 | 9 | 9 |
| Sucrose | 9.5 | 11.5 | 11.5 | 11.5 | 11.5 |
| Dextrose |  |  |  |  |  |
| Corn Syrup 63 DE (78% Solids) | 11 | 11 | 11 | 11 | 11 |
| Strawberry Puree | 61.88 | 40 | 40 |  |  |
| Apple Puree |  |  |  | 50 | 50 |
| Mango Puree |  |  |  |  |  |
| Water |  | 19.88 |  | 9.88 | 9.88 |
| Citric Acid | 0.5 | 0.5 | 0.25 | 0.5 | 0.5 |
| % soluble dietary fibre | 0.31 | 0.20 | 0.20 | 0.45 | 0.45 |
| % insoluble dietary fibre | 0.93 | 0.60 | 0.60 | 0.70 | 0.70 |
| Premix pH at 10° C. | 5.07 | 4.66 | 5.01 | 4.4 | 4.19 |
| Melted Ice Cream pH at 10° C. | 4.83 | 4.53 | 4.98 | 4.55 | 4.51 |
| Homogenisation Pressure (bar) | 140 | 140 | 140 | 140 | 330 |
| Overrun (%) | 100 | 100 | 100 | 100 | 100 |
| Meltdown Initiation Time at 20° C. (min) | 252 | 232 | 186 | 252 | 252 |
| Meltdown Initiation Time at 37° C. (min) | 135 | 103 | 125 | 159 | 223 |

|  | Example 6 | Example 7 | Example 8 | Example 9 | Example 10 |
|---|---|---|---|---|---|
| Skimmed Milk Powder | 4.12 | 4.12 | 4.12 | 6 | 4 |
| Whey | 4 | 4 | 4 |  | 4 |
| Coconut Oil | 9 | 9 |  | 9 | 9 |
| Sucrose | 11.5 | 11.5 | 5 | 20 | 3 |
| Dextrose |  |  | 11 | 10 | 24 |
| Corn Syrup 63 DE (78% Solids) | 11 |  | 11 |  |  |
| Strawberry Puree |  |  |  | 64.5 | 55.75 |
| Apple Puree | 30 |  | 65.38 |  |  |
| Mango Puree |  | 30 |  |  |  |
| Water | 29.88 | 29.88 |  |  |  |
| Citric Acid | 0.5 | 0.5 | 0.5 | 0.5 | 0.25 |
| % soluble dietary fibre | 0.27 | 0.19 | 0.59 | 0.32 | 0.28 |
| % insoluble dietary fibre | 0.42 | 0.32 | 0.92 | 0.90 | 0.84 |
| Premix pH at 10° C. | 4.36 | 4.18 | 4.65 | 4.85 | 4.95 |
| Melted Ice Cream pH at 10° C. | 4.36 | ND | 4.59 | 5.09 | 4.85 |
| Homogenisation Pressure | 140 | 140 | 140 | 140 | 140 |
| Overrun (%) | 100 | 100 | 100 | 100 | 200 |
| Meltdown Initiation Time at 20° C. (min) | 111 | 252 | 87 | 252 | 239 |
| Meltdown Initiation Time at 37° C. (min) | 75 | 193 | 50 | 179 | 86 |

EXAMPLES 11 TO 13

Formulations containing the components listed in Table 2 were prepared by the method described below.

Water was placed in a jacketed mix tank at 85° C., then skimmed milk powder, whey (if present), sucrose/corn syrup, coconut oil (if present) and cream (if present) were dissolved by mixing with a high shear mixer. Hot water was circulated in the jacket of the tank to maintain a premix temperature of 65° C.

The premix was heated using a plate heat exchanger to a temperature of 83° C., homogenised using a Crepaco single stage valve homogeniser at pressures of 140 bar. After holding the mix at 83° C. for 15 seconds, the mix was cooled using a plate heat exchanger to 5° C. The fruit puree was added to the pasteurised premix with stirring and the entire mix held at this temperature for at least 2 hours before freezing. In Examples 11 and 12 the fruit puree had been pre-pasteurised and aseptically stored prior to use. In Example 13 the puree was homogenised and pasteurised in a Crepaco homogeniser (140 bar) immediately prior to being added to the premix.

If necessary, citric acid was added to give the pH values listed in Table 2.

The mix containing the fruit puree was processed through a continuous ice cream freezer (type APV Technohoy MF75) fitted with a closed dasher rotating at a speed of 300-500 rpm and operating with a barrel pressure in the range 1-4 bar. All frozen aerated products were produced with a mix flow rate of 0.4 l/min, with an overrun of 100% and an extrusion temperature in the range −5° C. to −9° C. The frozen aerated products were collected in 500 ml waxed paper cartons and then hardened in a blast freezer at −35° C. for a period of 2 hours. The hardened products were then stored at −25° C.

TABLE 2

|  | Example 11 | Example 12 | Example 13 |
|---|---|---|---|
| Skimmed Milk Powder | 4.12 | 6.5 | 4.12 |
| Whey | 4 |  | 4 |
| Coconut Oil | 9 |  | 9 |
| Cream 48% Fat |  | 18.6 |  |
| Sucrose | 9.5 | 20 | 11.5 |
| Corn Syrup 63 DE (78% Solids) | 11 |  | 11 |
| Water | 20.38 | 14.9 | 20.38 |
| Strawberry Purée | 40.0 | 40.0 |  |
| Homogenised Strawberry Purée |  |  | 40.0 |
| % soluble dietary fibre | 0.20 | 0.20 | 0.20 |
| % insoluble dietary fibre | 0.60 | 0.60 | 0.60 |
| Premix pH at 10° C. | 4.63 | ND | 4.63 |
| Melted Ice Cream pH at 10° C. | 4.73 | 4.94 | 4.76 |
| Homogenisation Pressure | 140 | 140 | 140 |
| Overrun (%) | 100 | 100 | 100 |
| Meltdown Initiation Time at 20° C. (min) | 153 | 182 | 195 |
| Meltdown Initiation Time at 37° C. (min) | 81 | ND | 120 |

ND = not determined

CONTROL EXAMPLES 1 AND 2

Formulations containing the components listed in Table 3 were prepared by the method described below.

Water was placed in a jacketed mix tank at 85° C., then skimmed milk powder, whey, sucrose/corn syrup and coconut oil were dissolved by mixing with a high shear mixer. Hot water was circulated in the jacket of the tank to maintain a premix temperature of 65° C. In Control Example 1 the MGP, locust bean gum, guar gum and carrageenan were added to the premix.

The premix was heated using a plate heat exchanger to a temperature of 83° C., homogenised using a Crepaco single stage valve homogeniser at pressures of 140 bar. After holding the mix at 83° C. for 15 seconds, the mix was cooled using a plate heat exchanger to 5° C. and held at this temperature for at least 2 hours before freezing. In Control Example 1, colour and flavour were added to the cooled mix.

The mix was processed through a continuous ice cream freezer (type APV Technohoy MF75) fitted with a closed dasher rotating at a speed of 300-500 rpm and operating with a barrel pressure in the range 1-4 bar. The products were produced with a mix flow rate of 0.4 l/min, with an overrun of 100% and an extrusion temperature in the range −5° C. to −9° C. The frozen aerated products were collected in 500 ml waxed paper cartons and then hardened in a blast freezer at −35° C. for a period of 2 hours. The hardened products were then stored at −25° C.

TABLE 3

|  | Control 1 | Control 2 |
|---|---|---|
| Skimmed Milk Powder | 4.12 | 4.12 |
| Whey | 4 | 4 |
| Coconut Oil | 9 | 9 |
| Sucrose | 11.5 | 11.5 |
| Corn Syrup 63DE (78% Solids) | 11 | 11 |
| Water | 59.47 | 60.38 |
| MGP | 0.3 | |
| Locust Bean Gum | 0.14 | |
| Guar Gum | 0.075 | |
| Carrageenan L100 | 0.025 | |
| Flavour | 0.204 | |
| Colour | 0.17 | |
| Premix pH at 10° C. | 6.45 | 6.42 |
| Melted Ice Cream pH at 10° C. | 6.42 | 6.59 |
| Homogenisation Pressure | 140 | 140 |
| Overrun (%) | 100 | 100 |
| Meltdown Initiation Time at 20° C. (min) | 87 | 22 |
| Meltdown Initiation Time at 37° C. (min) | 37 | 8 |

The frozen aerated products of the present invention have a thick, smooth and creamy texture with excellent taste and flavour. The consumer gets a warm eating sensation when consuming the products. Because of the high meltdown resistance shown by the frozen aerated products of the present invention the products keep their shape for longer, can be refrozen and show less tendency to drip during consumption. Generally, for products that are sold on a stick there is less tendency for the product to fall off the stick during consumption.

The invention claimed is:

1. A frozen aerated product having an overrun of between about 10% and about 250% and a pH, when melted, in the range from about 3.5 to about 5.2, comprising:
   i) water;
   ii) 0 to about 20 w/w % fat;
   iii) 0.25 to about 20 w/w % milk solids containing proteins and lactose but not fat;
   iv) 0.05 to about 1.5 w/w % soluble dietary fibre and 0.1 to about 5 w/w % insoluble dietary fibre; and
   v) 0.1 to about 35 w/w % sweetener;
   wherein the product contains no additional stabilizers and no additional emulsifiers;
   wherein the frozen aerated product shows a resistance to meltdown and to serum leakage for extended periods of time as determined by having a meltdown initiation time greater than about 120 minutes when measured at 20° C.; and
   wherein the frozen aerated product is made by a process that includes either of the following steps:
   a) adjusting the pH of a fruit and/or vegetable puree to a value above an isoelectric point of any protein to be incorporated into the frozen aerated product followed by; producing a premix comprising fat, milk solids not fat, sweetener and about 5 to about 80 w/w % of said pH adjusted fruit and/or vegetable puree followed by; homogenizing and pasteurizing said premix; or
   b) homogenizing and pasteurizing a premix comprising water, fat, milk solids not fat and sweetener, cooling the pasteurized premix and adding to said premix a fruit and/or vegetable puree containing sufficient soluble and insoluble fibre to provide the necessary soluble and insoluble fibre in the frozen aerated product.

2. A frozen aerated product according to claim 1 wherein the soluble dietary fibre and the insoluble dietary fibre are derived from fruits or vegetables.

3. A frozen aerated product according to claim 2 wherein the soluble dietary fibre and the insoluble dietary fibre are derived from one or more fruit purees, one or more vegetable purees or mixtures thereof.

4. A frozen aerated product according to claim 1 comprising about 0.1 to about 1.2 w/w % soluble dietary fibre and about 0.2 to about 2 w/w % of insoluble dietary fibre.

5. A frozen aerated product according to claim 1 comprising about 0.2 to about 1 w/w % soluble dietary fibre and about 0.3 to about 1 w/w % of insoluble dietary fibre.

6. A frozen aerated product according to claim 1 wherein the milk solids comprise skim milk powder present at a level of 4 to 6.5 w/w %.

7. A frozen aerated product according to claim 1 wherein the meltdown initiation time is greater than 180 minutes.

8. A frozen aerated product having an overrun of between about 10% and about 250% and a pH, when melted, in the range from about 3.5 to about 5.2, comprising:
   i) water;
   ii) 0 to about 20 w/w % fat;
   iii) 0.25 to about 20 w/w % milk solids containing proteins and lactose but not fat; and
   iv) 0.05 to about 1.5 w/w % soluble dietary fibre and 0.1 to about 5 w/w % insoluble dietary fibre;
   v) 0.1 to about 35 w/w % sweetener;
   wherein the product contains no additional stabilizers and no additional emulsifiers;
   wherein the frozen aerated product shows a resistance to meltdown and to serum leakage for extended periods of time as determined by having a meltdown initiation time greater than about 120 minutes when measured at 20° C.; and
   wherein the frozen aerated product is made by a process that includes the steps of adjusting the pH of a fruit and/or vegetable puree to a value above an isoelectric point of any protein to be incorporated into the frozen aerated product followed by; producing a premix comprising fat, milk solids not fat, sweetener and about 5 to about 80 w/w % of said pH adjusted fruit and/or vegetable puree followed by; homogenizing and pasteurizing said premix.

* * * * *